(No Model.)
W. HAWKINS.
FEED TROUGH.
No. 396,563. Patented Jan. 22, 1889.
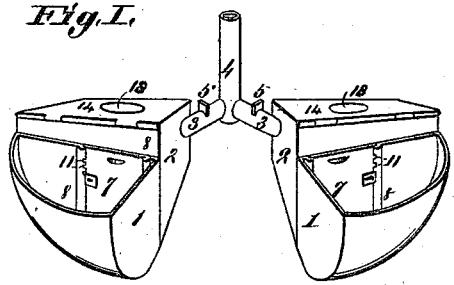
Fig. I.
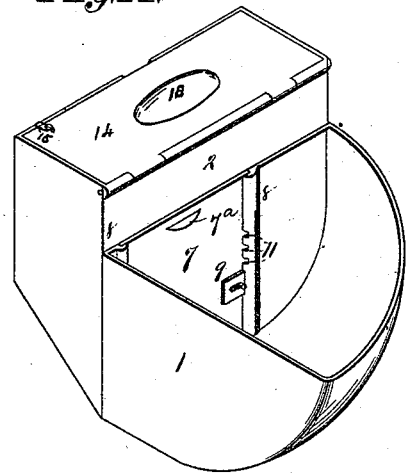
Fig. II.
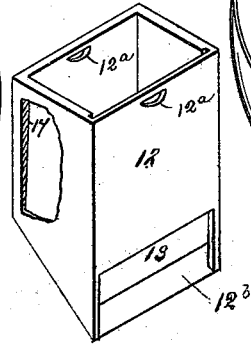
Fig. IV.
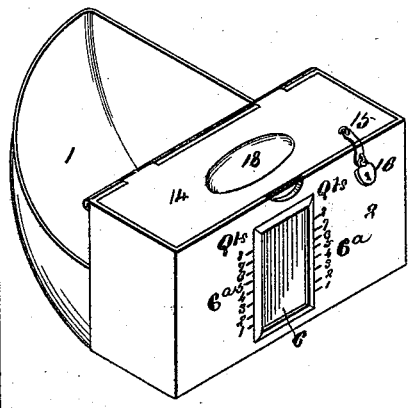
Fig. III.
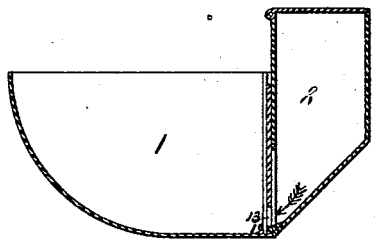
Fig. V.
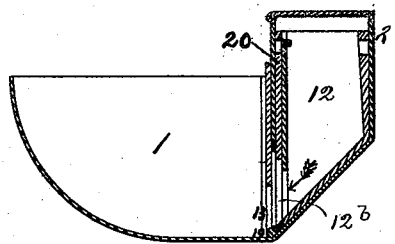
Fig. VI.
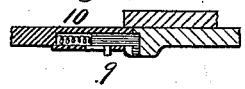
Fig. VII.
Attest:
Charles Pickles,
E. Arthur.
Inventor:
William Hawkins
By Knight Bro's.
Atty's
N. PETERS, Photo-Lithographer, Washington, D. C.

United States Patent Office.

WILLIAM HAWKINS, OF ST. LOUIS, MISSOURI.

FEED-TROUGH.

SPECIFICATION forming part of Letters Patent No. 396,563, dated January 22, 1889.

Application filed February 16, 1888. Serial No. 264,196. (No model.)

*To all whom it may concern:*

Be it known that I, WILLIAM HAWKINS, of the city of St. Louis, in the State of Missouri, have invented a certain new and useful Improvement in Feed-Boxes, of which the following is a full, clear, and exact description, reference being had to the accompanying drawings, forming part of this specification, and in which—

Figure I is a perspective view of the feed-boxes in two adjoining stalls with their attached provisional feed-boxes, showing also the feed-supply pipe which connects with the feed-bin in the loft above. Fig. II is a perspective front view of the feed-box with its provisional feed-box attached behind and the sliding shutter or drop-gate for shutting off the feed until needed and through its spring-catch adjustment to regulate the passage of said feed. Fig. III is a back view of the feed-box with its provisional attachment and graduated glass for observation and measuring the feed. Fig. IV is a mash-feed box for insertion within the provisional feed-box when soft mash is fed. Fig. V is a vertical section of the feed-box and its provisional attachment. Fig. VI is a like view with the mash-box inserted, and Fig. VII is an enlarged horizontal detail of the sliding drop-gate and its spring-catch for locking it to its adjustment.

This invention relates to devices for regulating the feeding of horses, mules, &c.; and the invention consists in features of novelty hereinafter fully described, and pointed out in the claims.

Referring to the drawings, in which similar figures of reference indicate like parts in all the views, 1 represents the feed-box out of which the animal eats. I have shown a corner box made in the form of a quadrant or segment of a sphere.

2 represents the provisional feed-box, into which the feed is measured from the connecting-tubes 3, that empty from the supply-chute 4, which connects with the feed-bin, that may be located in the loft or otherwise elevated above the feed-boxes and their chute. When there are adjoining stalls, one supply-chute may be utilized to furnish the feed for two boxes by providing at the foot of said chute two connecting-tubes, 3, which branch apart and relatively connect with each of said boxes; but when there is but a single stall one of the connecting-tubes may be dispensed with. Cut-off drop-slides 5 in the tubes 3 arrest the flow of the feed when the measure required has entered the provisional feed-box.

6 represents the glass, which is inserted in the outer side of the provisional feed-box, and $6^a$ are graduations which indicate the number of quarts of feed that are drawn from the chute, so that the feeder can regulate the supply. The glass provides a clear view of the inside of the provisional feed-box into which the feed is first placed, and the record on the adjoining side of the box or on the glass indicates the number of quarts that are placed in the box.

7 represents the sliding drop-shutter that closes the aperture between the feed-box and the provisional feed-box. This shutter slides in grooves formed by cleats 8 on each side of the aperture, and a sliding bolt, 9, secured to the shutter, is sprung into locking position by the spiral spring 10, that throws the bolt into correspondence with one of the recesses 11 in the cleat on the front side of said shutter. The shutter is narrow and formed with a finger-opening, $7^a$. By the use of this recessed cleat and spring-catch the slide can be set to let the feed pass through the open way 13 from the provisional box to the feed-box at just such rate as it is preferred that the horse shall eat, or the slide can be locked down close until such time as it is desired that the horse shall feed. Very frequently horses are placed in their stalls in too heated a condition to make it safe to allow them full play at a full feed, and yet it may be that especially-urgent business requires that he shall be hitched up again with but little delay. In such cases the partition sliding shutter can be bolted at but a slight elevation, so that the feed will not come through fast and the horse will gather up what little has passed through, and then, it may be, take a bite of hay. In the meantime, as the bottom of the provisionary box is sharply inclined toward the partially-opened shutter of the feed-box, as the horse noses against the shutter the grain continues to come slowly through, so that he gets an occasional bite.

If preferred, the shutter can be raised sufficiently to let through only such a portion of the feed that will not hurt the horse, and immediately shut down and bolted.

Another constant advantage in the device, whether the horse be too much heated for a full feed at once or not, is that by leaving the shutter partially elevated the feed will be presented to the horse as it gradually works through into the feed-box, about a mouthful at a time, and the horse is not then apt to bolt the grain or other feed half masticated, as they have a frequent habit of doing, especially after a long fast, when it hurts them the worst, when they see a full feed before them. He is careful of and masticates well the small amount he sees before him when the rest is shut off.

Another advantageous feature of the invention is that the horse does not slobber over the whole feed and make the latter part unfit to eat. Perhaps there is no animal that is more subject to colds than the horse, and the very act of eating the grain in great haste, when it is almost bolted, without mastication, distresses him the more and makes him slobber and snort, until in the latter end his feed is in a condition to do him more harm than good if he swallows it; also, when the feed is thus gradually furnished to the feed-box the horse cannot nose it out of the trough to fall down and be trampled under his feet as readily as he frequently does when a full feed is in the box.

It has often been a subject for remark among those who have the care of horses that when a full feed is before a horse he is apt to take a large mouthful—more, indeed, than he can successfully masticate—and the result is that some of it is bolted whole and much of it is dropped over the floor, for a horse with a full mouthful almost always lifts and throws around his head. The same horse is very careful and economic with the small remainder of his feed at the last. By this device the feed can be furnished to him just at such rate that he will be careful not to waste the little that is presented before him, and so is alike careful all through.

12 represents a mash-box used when soft feed is fed. The sides of the box are preferably made beveling on the inside toward the bottom, which itself is beveled to the same angle as the provisional box, as shown by part broken away in Fig. IV and in cross-section in Fig. VI. This bevel inner surface, 17, which tapers or flares downwardly toward the bottom, thus enlarges the capacity of the box at bottom and facilitates the escape of the mash into the feed-box.

The mash-box has the vertically-sliding shutter 20, which is closed when such mash-box is filled preparatory to insertion within the provisional feed-box, and when inserted is opened to allow the flow of the mash into the feed-box at such time as the outer communicating shutter shall be raised. It is obvious that this removable box can be used for grain as well as mash, and it may be convenient and very desirable to use the same as a receptacle for conveying the feed of any kind from a distant point to the provisional feed-box, in which case the material is placed therein and the box closed and conveyed to and inserted in the provisional feed-box, which acts as a frame for supporting it, and the shutter then opened, as explained.

The mash-box has finger-openings $12^a$ and outlet $12^b$, and is set inside the provisional box, and the shutter 7 being elevated, the mash gradually works out of the elongated slot 13 in the front of the box at bottom. The horse soon learns to help to work it out, but cannot get it fast enough to be wasteful and careless with it.

The provisional box has a hinged lid, 14, which may open from the front or back, as preferred. A hasp, 15, and padlock 16 are intended to prevent unauthorized parties from tampering with the feed.

A salt-trough, 18, is recessed in the lid of the provisional box to enable horses to help themselves to that useful condiment.

It is a well-known fact that a whole stable full of horses are irritated and many of them become fractious when a single horse is openly fed grain, which operation they have a remarkable facility to both hear and scent. They know well what the rattling of the grain means, and their sense of smell is so well developed that it also calls their attention to it. By the use of this device all such irritation is avoided. The feed measured to the quantity required can be let into the provisional feed-boxes at any time previous to feeding, so that all there is to do when any horse is fed is to lift the sliding shutter that communicates with the feed-box to the required height to let the feed through at the rate required without disturbing the other horses in the stable.

The lock 16, attached to the lid of the provisional feed-box, prevents unauthorized tampering with the grain, especially as the feed-bin, from which the supply comes, may also be under lock and key. This precludes, in a great measure, the petit larcenies in that line that are prevalent in some large stables, which are otherwise difficult to guard against.

It will be seen that there is an offset or drop, 19, at the bottom of the feed-outlet 13 as it passes from the provisional feed-box to the feed-box proper. This drop makes a definite line between the floors of the said boxes, and both aids the discharge of the feed and serves as a partial cut-off to make more definite to the animal feeding the line of demarkation between the available feed in the feed-box proper and the as yet unavailable portion in the provisional box.

The various parts of my device may be constructed of galvanized sheet-iron or any other suitable material.

I claim as my invention—

1. In a device for feeding animals, the combination, with a feed-bin and box communicating therewith, of a removable close receptacle, 12, fitting the box and having a shutter whereby it may be filled at a distant point, conveyed to and inserted in the box, and then opened to allow the flow of the material, as fully explained.

2. In a feeding device for animals, the combination of a feed-bin, a provisional feed-box connected with one side of the bin, a shutter located between the bin and provisional box, a mash-box within the provisional box, having an outlet, and a shutter located between the boxes, substantially as described.

3. In a feeding device for animals, the combination, with a provisional box, of the removable mash-box fitting within the provisional box, substantially as described.

4. In a feeding device for animals, the combination of a provisional feed-box and a removable mash-box fitting therein, having downwardly-flaring chamber, substantially as described.

WILLIAM HAWKINS.

In presence of—
 BENJN. A. KNIGHT,
 EDWD. S. KNIGHT.